United States Patent
Kotitschke et al.

(10) Patent No.: US 9,358,709 B2
(45) Date of Patent: Jun. 7, 2016

(54) CARRIER FOR CLEANING ELEMENTS AND METHOD FOR PRODUCING SUCH CARRIERS FOR USE IN THE PRODUCTION OF TOOTHBRUSH HEADS

(71) Applicant: Braun GmbH, Kronberg (DE)

(72) Inventors: Joerg Kotitschke, Waldems (DE);
Stefan Scheurich, Triefenstein (DE);
Uwe Tretrop, Frankfurt/Main (DE);
Jochen Ganninger, Eschborn (DE);
Ralf Wustrack, Schwalbach (DE)

(73) Assignee: BRAUN GMBH, Kronberg (DE)

(*) Notice: Subject to any disclaimer, the term of this patent is extended or adjusted under 35 U.S.C. 154(b) by 416 days.

(21) Appl. No.: 13/920,114

(22) Filed: Jun. 18, 2013

(65) Prior Publication Data
US 2013/0334732 A1  Dec. 19, 2013

(30) Foreign Application Priority Data

Jun. 19, 2012 (EP) .................... 12172532
May 22, 2013 (EP) .................... 13168813

(51) Int. Cl.
*B29C 45/14* (2006.01)
*A46D 1/00* (2006.01)
*A46D 3/00* (2006.01)
*A46D 3/08* (2006.01)

(52) U.S. Cl.
CPC ......... *B29C 45/14778* (2013.01); *A46D 1/00* (2013.01); *A46D 3/00* (2013.01); *A46D 3/005* (2013.01); *A46D 3/08* (2013.01)

(58) Field of Classification Search
None
See application file for complete search history.

(56) References Cited

U.S. PATENT DOCUMENTS

| | | | | |
|---|---|---|---|---|
| 3,408,112 A * | 10/1968 | Piotrowski | ........... | A46D 3/005 15/159.1 |
| 4,892,698 A * | 1/1990 | Weihrauch | ........... | A46B 3/06 264/243 |
| 5,458,400 A * | 10/1995 | Meyer | ........... | A46D 3/005 264/243 |
| 5,474,366 A * | 12/1995 | Strutt | ........... | A46D 3/005 300/21 |
| 5,730,503 A | 3/1998 | Tyler et al. | | |
| 2003/0155802 A1 | 8/2003 | Vankov et al. | | |
| 2004/0103492 A1* | 6/2004 | Kwon | ........... | A46B 3/04 15/167.1 |
| 2012/0272469 A1* | 11/2012 | Kwon | ........... | A46B 3/04 15/167.1 |
| 2012/0317737 A1* | 12/2012 | Birk | ........... | A46B 3/06 15/106 |

FOREIGN PATENT DOCUMENTS

| | | | |
|---|---|---|---|
| BE | 677 121 A | 8/1966 | |
| DE | 10108339 A1 * | 8/2002 | ............ A46D 1/08 |
| EP | 1864588 A2 * | 12/2007 | ............ A46B 3/06 |

OTHER PUBLICATIONS

European Search Report for EP 12 17 2532, Z8677FQ, dated Nov. 8, 2012.

* cited by examiner

*Primary Examiner* — Ryan Ochylski
(74) *Attorney, Agent, or Firm* — Vladimir Vitenberg (57) ABSTRACT

A carrier for providing at least one cleaning element to a mold cavity is disclosed. The carrier includes a main body having a first surface including one or more openings of one or more blind holes having a depth (D) for carrying the at least one cleaning element and a second surface being substantially parallel to the first surface. The main body includes at least two partial bodies which are arranged adjacent to each other in the direction of the one or more blind holes so that at least one partial body comprises one or more through-holes as part of the one or more blind holes and one partial body comprising the second surface of the main body comprises the blind end of the one or more blind-holes.

12 Claims, 6 Drawing Sheets

CARRIER FOR CLEANING ELEMENTS AND METHOD FOR PRODUCING SUCH CARRIERS FOR USE IN THE PRODUCTION OF TOOTHBRUSH HEADS

FIELD OF THE INVENTION

The present disclosure relates to a carrier and a bar of more than one carrier and/or bars for providing cleaning elements to a mold cavity.

BACKGROUND OF THE INVENTION

Anchor-free methods are known to fasten cleaning elements, such as bristle tufts, in a brush head, in particular a toothbrush head or a part thereof. The anchor-free or hot-tufting methods fasten the cleaning elements in the brush head by means of a forming technique. Usually, bristle tufts are melted at their ends to form thickenings in order to increase the pull-out resistance of the tufts. These thickenings can be over-molded with a plastic material to form a brush head or a part thereof. Cleaning elements made of materials which are combinable with the material used for the brush head may also be securely fastened by a chemical connection.

In order to over-mold the cleaning elements, the ends to be over-molded have to be arranged in such that the plastic material can surround and enclose these ends during the molding-procedure. Therefore the cleaning elements have to be provided by a carrier. These carriers have to resist the molding temperatures and should cover the free ends of the cleaning elements against the melted material during the molding process. Further, different cleaning element arrangements shall be provided. Currently used carriers consist of stainless steel and comprise one or more blind ended drill-holes. These carriers are very expensive and can only be used for one predefined cleaning element geometry.

Accordingly, there is a need for cheaper, temperature resistant carriers having a higher geometric flexibility in order to provide variable and flexible cleaning element arrangements for the production of a variety of toothbrush heads.

SUMMARY OF THE INVENTION

In one embodiment, a carrier for providing at least one cleaning element to a mold cavity is provided. The carrier includes a main body having a first surface including one or more openings of one or more blind holes having a depth (D) for carrying the at least one cleaning element and a second surface being substantially parallel to the first surface. The main body includes at least two partial bodies which are arranged adjacent to each other in the direction of the one or more blind holes so that at least one partial body comprises one or more through-holes as part of the one or more blind holes and one partial body comprising the second surface of the main body comprises the blind end of the one or more blind-holes. The depth (D) of the one or more blind-holes is identical to the free length of the at least one cleaning element and wherein a cross-sectional area (A) of the one or more blind holes increases in the direction of the blind end of the one or more blind holes.

These and other features, aspects and advantages of specific embodiments will become evident to those skilled in the art from a reading of the present disclosure.

BRIEF DESCRIPTION OF THE DRAWINGS

While the specification concludes with claims which particularly point out and distinctly claim the subject matter that is regarded as the invention, it is believed the various embodiments will be better understood from the following description taken in conjunction with the accompanying drawings, in which:

DETAILED DESCRIPTION OF THE INVENTION

The following text sets forth a broad description of numerous different embodiments of the present disclosure. The description is to be construed as exemplary only and does not describe every possible embodiment since describing every possible embodiment would be impractical, if not impossible. It will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

In accordance with one aspect of the disclosure, there is provided a carrier for providing at least one cleaning element to a mold cavity in order to mold a cleaning element carrier or a toothbrush head or at least a part of a brush head in the mold cavity. In one embodiment, the carrier includes a main body having a first surface comprising one or more opening(s) of one or more blind hole(s) for carrying the at least one cleaning element and a second surface being substantially parallel to the first surface. The term "main body" as used herein, shall describe the whole carrier itself. The main body shall comprise at least two surfaces which are substantially parallel to each other. "Substantially parallel to each other" as used herein shall comprise surfaces which are manufactured to be parallel. "Parallel" arrangement of surfaces as used herein may also include offsets, curbs, recesses or the like in one or both surface(s) as long as the majority of the surface area is arranged parallel to each other. The geometric appearance of the main body may be a polygonal body, for example a parallelogram, a rectangle or a quadrate. Two or more main bodies may be combined to a carrier band. Suitable carrier bands may comprise an even number of carriers, for example 4, 6, 8, 10, 12, 14, 16 or more. Two or more carrier bands may be arranged on a plate for easier handling.

On a first surface the main body comprises openings of one or more blind hole(s). "Blind hole" as used herein, shall mean any blind ended recess which may show any surface contour. That includes, but is not limited to, a blind hole forming a blind ended recess in at least one of the partial bodies or a through-hole formed in at least one of the partial bodies which is shut or terminated by another partial body having for example a flat surface. Alternatively, a stopper plate may be used to form the blind end of the through-hole. In one embodiment, a stopper plate may be placed directly adjacent to the partial body forming the through-hole or a distance might be present between the stopper plate and the through-hole. Blind holes may be regular or irregular cylindrical holes, regular or irregular rectangular holes, twisted cylindrical or rectangular holes or any other geometric appearance producible by the method of producing the carriers described herein. Twisted cylindrical or rectangular holes may be twisted along the depth of the blind hole regularly or irregularly. The twist may show complete or partial turns and combinations thereof. In addition, the twist may show one or more complete or partial turns. The inner surface contour of a blind hole may change along its depth.

The base of the blind hole onto which the cleaning elements are arranged may show a flat surface or may show a contour. The flat surface may be in parallel to the first and second surface or may be arranged inclined to it. In addition or alternatively, the base of the blind hole may show any geometric contour, such as curves, depressions and combinations thereof. The contour of the base corresponds to the surface contour of the cleaning element which is arranged in the blind hole.

The blind holes may be deep holes meaning that the ratio from depth to cross sectional area may be greater than about 4; in another embodiment greater than about 5; in another embodiment greater than about 6; and in yet another embodiment greater than about 7. The depth of the one or more blind hole(s) is identical to the free length of the at least one cleaning element. The "free length of the at least one cleaning element" as understood herein is the length of the at least one cleaning element which extends from the surface of the final brush head after molding. That means after the at least one cleaning element is placed into one blind hole the end(s) of the at least one cleaning element protrudes from the first surface of the carrier and said length which protrudes from said surface is the length which will be embedded into the brush head during the injection molding step.

The blind holes may be arranged perpendicular or inclined to the first and second surface of the main body of the carrier. Inclination angles which might be used for the arrangement of the blind holes may be in the range of about 45° to about 90°, or in the range of about 55° to about 88°, or in the range of about 65° to about 85°, or in the range of about 70° to about 80°, or in the range of about 72° to about 78°. All inclination angles given are measured to the first and/or second surface. The inclination may be in any directions from the plumb line. One or more blind hole(s) may be arranged in each carrier. The number of the blind holes arranged in one carrier belongs to the number of cleaning elements present in the brush head to be produced. Suitable numbers of cleaning elements in one brush head may be in the range of about 10 to about 60 or in the range of about 15 to about 50 or in the range of about 20 to about 40. The blind holes arranged in the carrier may be arranged in a pattern that corresponds to the bristle design, i.e. the bristle pattern, in the brush head or the cleaning element carrier to be molded. The brush head and/or cleaning element carrier may be a toothbrush or a part of it. The blind holes arranged in the carrier may be identical or different to each other.

The main body of the carrier comprises at least two partial bodies, which are arranged adjacent to each other in the direction of the one or more blind hole(s). Being "adjacent to each other in the direction of the one or more blind hole(s)" as used herein shall mean that the main body is sub-divided into the partial bodies along the depth of the blind hole(s). That means the partial bodies all show contact surfaces which face the adjacent partial body and which are substantially parallel to the first and/or second surface of the main body. The one or more blind hole(s) are formed by all partial bodies forming the main body. That means one or more partial bodies comprise a through-hole as part of each blind hole and only one partial body comprises the blind end of the blind holes. "Comprising the blind end of the blind holes" as used herein shall mean that the partial body may have a recess forming a blind hole or just represents a plane surface being arranged adjacent to a through-hole of another partial body in order to shut the through-hole in order to form the blind hole. At the second surface of the main body the position of the blind hole(s) is not visible as the blind ends cannot be distinguished from the surface of the main body. The partial body comprising the second surface may also be constructed as a special stopper plate. A stopper plate may be any tool, for example a piston, which may show a surface corresponding to the surface of the through-holes and which is suitable to be placed against the ends of the cleaning elements in order to hold the cleaning elements in a predefined position in the through-holes thereby forming the blind end of the blind hole.

The at least two partial bodies may be arranged in direct contact to each other or may be arranged in that a gap is located between the at least two partial bodies. "Direct contact of the partial bodies" as used herein shall mean that the partial bodies are still movable in at least one direction along the contact surfaces. Said movement may be parallel to the first and second surfaces. If a gap is arranged between the at least two partial bodies a spacer is arranged at one side of the partial bodies in order to predefine the gap. The gap may have a height being in the range of about 0.1 mm to about 3.0 mm, or in the range of about 0.1 mm to about 2.0 mm, or in the range of about 0.1 mm to about 1.5 mm or in the range of about 0.2 mm to about 0.8 mm. The height of the gap may be changeable automatically during the molding process. For example, cleaning elements can be positioned in the blind holes for being processed at their ends using manipulating tools. Then the gap may be increased in order to dislocate the cleaning elements from and/or in the blind holes. Alternatively, the gap may be decreased in order to create free space between the manipulated ends of the cleaning elements and the first surface of the carrier. Creating or increasing the free space between the ends of the cleaning elements and the first surface of the carrier increases the embedding depth of the cleaning elements, thereby increasing the pull-out resistance of the cleaning elements from plastic material. For example, the gap may be reduced to zero before or during shutting the mold cavity. The spacer can be any spacer which is able to hold the partial bodies of the carrier in a predefined position. A suitable, spacer may be a spring. The spring may be arranged at an anchor bolt.

The cross-sectional area of the one or more blind hole(s) increases in the direction of the blind end(s). Alternatively, the cross-sectional area of the one or more blind hole(s) may be constant or may decrease. In addition, the form of the cross-sectional area may vary along the depth of the blind hole. In addition or alternatively, the cross-sectional area of the one or more blind hole(s) may be constant, may increase, may decrease and/or may vary with respect to each partial body. If the cross-sectional area increases the difference of the cross-sectional areas may be in the range of about 0.01 mm to about 3.0 mm or in the range of about 0.05 mm to about 2 mm, or in the range of about 0.1 to about 1.5 mm, or in the range of about 0.1 to about 1 mm, or in the range of about 0.1 to about 0.5 mm. Due to an increasing cross-sectional area the cleaning element sticks tightly only in the part of the blind hole having the smallest cross-sectional area. Thus, the larger cross-sectional areas can be manufactured with higher tolerances and less precisely. Further, cleaning elements will not be damaged during positioning them into the blind hole for example by folding or roughing the surface. Due to a decreasing cross-sectional area cleaning elements can be formed, deformed, condensed and/or compressed during the placement in the blind hole(s). In one example, the blind hole may show a cylindrical shape. In this case the diameter of the blind hole may increase, may decrease or may remain constant along the depth of the blind hole.

The cross-sectional area of the blind-hole may correspond to the cross-sectional area of the cleaning element to be arranged in the blind hole. That means that the shape of the cleaning element may be defined by the cavity shape of the blind hole. For example, the blind hole may form or stabilize the shape of the cleaning element.

One or more of the partial bodies of the carrier as disclosed herein may comprise an opening connecting the blind hole and the atmosphere. Due to the opening air may escape during filling of the cleaning elements into the blind hole(s) of the carrier. The opening may be for example, a drill hole or a free space between the partial bodies or both.

Suitable cleaning elements which may be provided in the carrier as described herein may be for example, bristle tufts comprising one or more bristle filament(s) which are combined to each other at the end to be embedded. Bristle filaments may consist of natural materials or plastics or plastic mixtures. A plastic which can be used to form bristle filaments is for example a polyamide (PA), a polybutylterephthalate (PBT), a polyethylterephthalate (PET), or mixtures thereof. In addition or alternatively, the cleaning elements may be elastomeric elements such as for example, a nub, a pin, a fin, a wall, a bar, a gutter, a curve, a circle, a lamella, a textured element, a polishing element such as, for example, a polishing cup, or a tongue cleaning element or a combination thereof. Materials which may be used to form elastomeric elements are for example rubber, polypropylene (PP) or thermoplastic elastomers (TPE) the latter having a Shore A hardness in the range of about 10 to about 70 or in the range of about 20 to about 50 or in the range of about 30 to about 45 or a mixture thereof. Cleaning elements may be produced before and then filled into the one or more blind hole(s) of the carrier. In addition or alternatively, the one or more blind hole(s) may be used as a mold cavity. For example, an elastomeric element may be molded in a blind hole as described herein.

The first surface of the carrier may also comprise a recess. The recess may extend over at least 80% of the first surface. The recess may represent the mold cavity for the surface contour of a cleaning element carrier, such a brush head or a part of it. That means, if the carrier as described herein is used to provide cleaning elements to a mold cavity the plastic material which is injected into the mold cavity may flow around the cleaning elements provided and may flow into the recess to cast the cleaning elements in the plastic body to be molded.

The carrier as described herein may comprise different materials which show suitable properties for providing cleaning elements to a mold cavity. For example, the material from which the carrier is made may be a high-grade material, meaning that the material is able to resist high temperatures and pressures. It should be abrasion resistant and should show a high impact resistant. Suitable materials are for example steel, ceramic, plastic material or synthetic resin. That means at least one partial body may comprise or may consist of steel, ceramic, plastic material or synthetic resin. In particular, the partial body comprising the first surface may comprise or may consist of steel, ceramic, plastic material or synthetic resin. Suitable plastic materials from which a carrier or a part of a carrier as disclosed herein can be formed are for example, polyoxymethylene (POM), polypropylene (PP), polycarbonate (PC), Polyamide (PA), polybutylterephthalate (PBT), acrylonitrile styrene acrylic ester (ASA), acrylonitrile butadiene styrene (ABS) or a mixture thereof. In particular, the plastic material may be for example VisiJet EX200 plastic available for example from 3D systems, Rock Hill USA. In addition or alternatively, the carrier as disclosed herein may be coated with a high-grade material, for example steel, ceramic, plastic material or synthetic resin in order to cover the first surface.

According to another aspect a method for producing a carrier as disclosed herein is provided, wherein the carrier is produced by rapid prototyping techniques. The term "rapid prototyping" as used herein shall comprise all model forming three dimensional techniques known in the prior art. For example 3D printing, contour crafting (CC), electronic beam melting (EBM), fused deposition modeling (FDM), laminated object modeling (LOM), laser engineered net shaping (LENS), laser cladding, multi jet modeling (MJM), polyamide casting, selective laser melting (SLM), selective laser sintering (SLS), space puzzle molding (SPM) or stereo-lithography (STL or SLA) can be used to produce a carrier as disclosed herein.

According to another aspect a method of producing a brush head, in particular a toothbrush head or a part thereof, such as a bristle carrier is disclosed. Said method comprises the step of providing one end of at least one cleaning element to a mold cavity for over-molding using a carrier as disclosed herein and the step of over-molding the provided end with a plastic material. The at least one cleaning element to be over-molded may be a bristle tuft or an elastomeric element such as a nub, a pin, a fin, a wall, a bar, a gutter, a curve, a circle, a textured element, a polishing element such as, for example, polishing cups or a tongue cleaning element or a combination thereof. A bristle tuft may be a plurality of filaments having any outer shape and being combined to each other at the end to be over-molded. For combining the filament ends the latter may be subjected to heat in order to molten the filaments partially. Thereby a round thickening is formed. Then, the molten ends may be subjected to any kind of plunger to form a flat and even structure. Melting and flattening may be performed in one step using a heated plunger. Thus, the method may comprise the step of heating the ends of bristle filaments to form a thickening and flattening the thickening by pressing a flattening tool, for example a plunger, against the thickening until the thickening is in direct contact with the first surface of the carrier. In addition, the method may comprise the step of moving the first surface of the carrier in the direction of the second surface so that a gap is formed between the thickening and the first surface of the carrier to create free space for the plastic material to be injected. Thereby, the cleaning elements are embedded safe and strongly in the brush head, in particular the toothbrush head or the part of it so that a high retention force is generated. Brush heads, toothbrush heads or parts of it, such as bristle carriers produced by the method as disclosed herein can be used for manual or electric toothbrushes. Alternatively, any kind of brush head carrying cleaning elements on at least one of its surfaces may be produced using the method and the carriers disclosed herein.

In addition or alternatively, the method may comprise the step of in-molding one or more of the cleaning elements. For example, one or more elastomeric elements as disclosed above may be formed by injection molding in one or more of the blind hole(s) provided by the carrier. The step of in-molding of cleaning elements should be performed before the remaining blind holes are filled with additional cleaning elements or after the remaining blind holes are filled with additional cleaning elements. Then, all cleaning elements can be provided to a mold cavity to inject the brush head, in particular the toothbrush head or a part of it.

There is also disclosed the use of a carrier as disclosed herein, wherein the carrier is used for providing one end of at least one cleaning element, in particular of at least one bristle tuft, to a mold cavity for over-molding said end with a plastic material. In addition or alternatively, at least a part of a brush head, in particular a tooth brush head is formed during the over-molding of the end of the at least one cleaning element provided by the carrier as disclosed herein.

In the following, a detailed description of several example embodiments will be given. It is noted that all features described in the present disclosure, whether they are disclosed in the previous description of more general embodiments or in the following description of example embodiments, even though they may be described in the context of a particular embodiment, are of course meant to be disclosed as individual features that can be combined with all other disclosed features as long as this would not contradict the gist and scope of the present disclosure. In particular, all features disclosed for either one of the carriers, the method of producing the carrier or the method of producing a brush head may also be applied to the other one, if applicable.

Figure 1A:
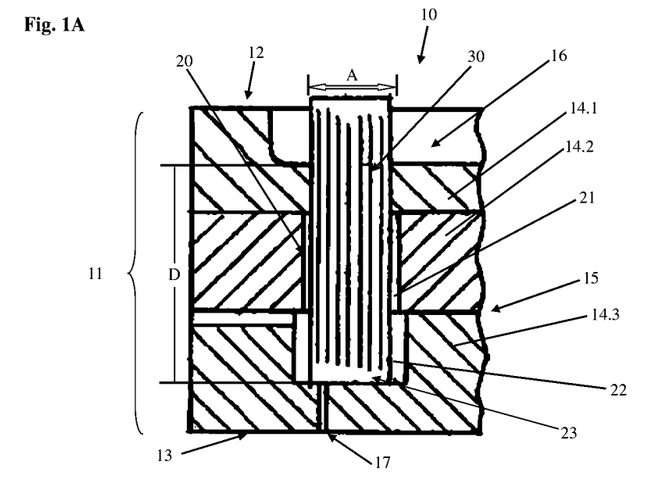
FIG. 1A is a schematic side view of a part of a carrier comprising three partial bodies providing a cleaning element in a blind hole according to one or more embodiments illustrated and described herein.

FIG. 1A shows an example embodiment of a carrier 10 for providing at least one cleaning element 30 to a mold cavity. A sectional view of a part of the carrier 10 is shown. The carrier 10 comprises a main body 11 having a first surface 12 and a second surface 13 the latter being parallel to the first surface 12. The first surface 12 comprises an opening of a blind hole 20 for carrying one of the cleaning elements 30. The main body 11 comprises three partial bodies 14.1, 14.2, 14.3 which are arranged adjacent to each other in the direction of the blind hole 20 so that the partial bodies 14.1 and 14.2 each comprise a through hole 21 as part of the blind hole 20 and the partial body 14.3 comprising the second surface 13 of the main body 11 comprises the blind end 22 of the blind-hole 20. The partial bodies 14.1, 14.2, 14.3 may be arranged in direct contact so that the parallel surfaces represent contact surfaces 15. All partial bodies 14.1, 14.2, 14.3 may be connected to each other by connection means.

The cross-sectional area A of the blind hole 20 corresponds to the outline of the cleaning element 30 with respect to the partial body 14.1. The cross-sectional area A of the through hole 21 of partial body 14.2 is increased compared to the cross-sectional area A of the through hole 21 of partial body 14.1 and the cross-sectional area A of the blind end 22 of partial body 14.3 is increased compared to the cross-sectional area A of the partial body 14.2. The difference between the cross-sectional areas A of the holes 21, 22 of partial bodies 14.1, 14.2 and 14.3 may be in the range of about 0.01 to about 0.5 mm. Due to the increase in the cross-sectional areas A of the holes 21, 22 the partial bodies 14.2 and 14.3 may be manufactured with higher tolerances and may be manufactured from a cheaper material. If the cleaning elements are filled into the blind hole 20 frictions appears in the upper partial body 14.1 only. Thus, only the partial body 14.1 needs to comprise a through hole 21 having a smooth surface.

The first surface 12 may comprise a recess 16, wherein the recess 16 may extend beyond at least about 80% of the first surface 12. The recess 16 may be used as part of the mold cavity. For example the part of the brush head which shall carry the cleaning elements 30 may be formed in said recess 16. Thus, the recess 16 may show any shape a brush head may have. The depth D of the blind hole 20 corresponds to the free length of the at least one cleaning element 30. That means, if the at least one cleaning element 30 is in contact to the base 23 of the blind end 22 of the blind hole 20, the opposite end(s) of the at least one cleaning elements 30 protrude from the carrier 10. If a recess 16 is present the at least one cleaning elements 30 protrude at least from the surface of the recess 16. Due to the cleaning elements 30 protruding from the carrier 10, their ends can be embedded into a brush head by injection molding.

The carrier 10 may consist of a high grade material. Alternatively, only the partial body 14.1 may be produced from a high grade material as only the partial body 14.1 is subjected to the injection molding process including high pressures and high temperatures. For example, the partial body 14.1 may consist of steel or ceramic or plastic material or synthetic resin.

The partial body 14.3 may comprise an opening 17, for instance a drill hole, connecting the blind hole 20 and the atmosphere. Due to the opening 17 air may escape during filling of the cleaning elements 30. The opening 17 may have a diameter in the range of about 0.01 mm to about 0.1 mm.

Figure 1B:
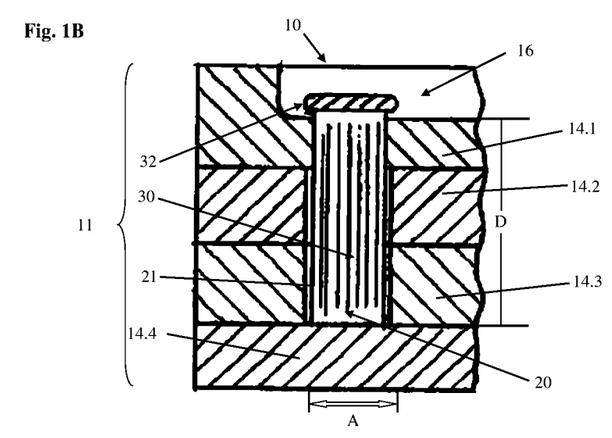
FIG. 1B is a schematic side view of a part of a carrier comprising four partial bodies providing a cleaning element in a blind hole according to one or more embodiments illustrated and described herein.

FIG. 1B shows another example embodiment of a carrier 10 for providing at least one cleaning element 30 to a mold cavity. A sectional view of a part of the carrier 10 is shown. All features disclosed in FIG. 1A, whether described individually or in combination are also applicable to the embodiment shown in FIG. 1B. Features that are in common with the carrier 10 shown in FIG. 1A are designated with the same reference numerals. The main body 11 of the carrier 10 shown in FIG. 1B comprises four partial bodies 14.1, 14.2, 14.3, 14.4. Partial bodies 14.1, 14.2, 14.3 each comprise a through hole 21. Partial body 14.4 does not show any hole. The blind hole 20 is formed by three through holes 21 and one shutting partial body 14.4. This construction of the blind hole 20 is very cost effective. The cross-sectional area A of the through hole 21 of the partial body 14.1 comprising the first surface 12 corresponds to the outline of the cleaning element 30. The cross-sectional area A of the through holes 21 of partial bodies 14.2 and 14.3 are increased compared to the cross-sectional area A of the through hole 21 of partial body 14.1, but are constant compared to each other.

On top of the cleaning element 30 a thickening 32 may be formed which can be arranged in the recess 16. Such a thickening 32 may be formed by pressing a plunger to melted ends of the cleaning element 30. During the injection of the plastic material in order to form a brush head the thickening 32 is embedded into the molten plastic.

Figure 1C:
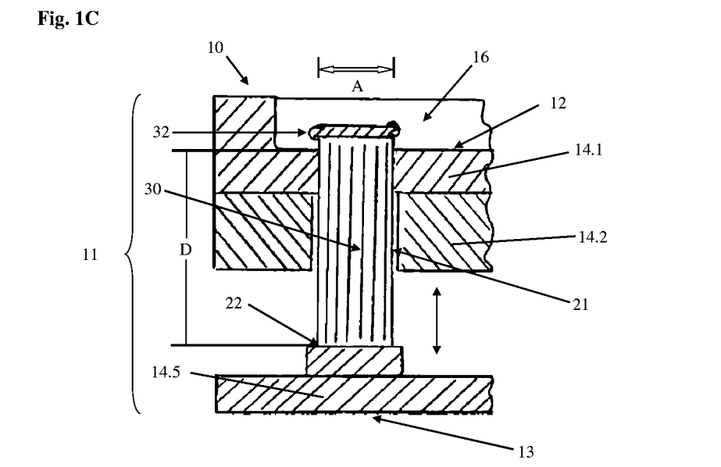
FIG. 1C is a schematic side view of a part of a carrier comprising two partial bodies providing a cleaning element in a through-hole and a stopper plate having the ends of the cleaning elements placed upon thereby forming a blind hole according to one or more embodiments illustrated and described herein.

FIG. 1C shows another example embodiment of a carrier 10 for providing at least one cleaning element 30 to a mold cavity. A sectional view of a part of the carrier 10 is shown. All features disclosed in FIGS. 1A and B, whether described individually or in combination are also applicable to the embodiment shown in FIG. 1C. Features that are in common with the carrier 10 shown in FIGS. 1A and B are designated with the same reference numerals. The main body 11 of the carrier 10 shown in FIG. 1C comprises two partial bodies 14.1, 14.2 and a stopper plate 14.5. The stopper plate may be for example a piston. That means the stopper plate 14.5 comprises the second surface 13. Partial bodies 14.1 and 14.2 comprise a through hole 21. The stopper plate 14.5 does not show any hole, but represents a flat area 22 onto which the ends of the cleaning element 30 can be placed. Although the stopper plate 14.5 does not comprise any recess, it limits the cleaning elements 30 in its position inside the main body 11. Thus, a functional blind hole 20 is formed by two through holes 21 and one stopper plate 14.5. This construction of the blind hole 20 is very cost effective and very flexible. The depth D of the blind hole 20 can be adjusted by moving the stopper plate 14.5 in the direction of and/or away from the partial body 14.2. The cross-sectional area A of the through hole 21 of the partial body 14.1 comprising the first surface 12 corresponds to the outline of the cleaning element 30. The cross-sectional area A of the through hole 21 of partial bodies 14.2 increases slightly compared to the cross-sectional area A of the through hole 21 of partial body 14.1 so that the cleaning element 30 can be placed in the through-hole 21 of the partial body 14.2 without having contact to the inner surface so that the surface of the cleaning element may not be damaged.

On top of the cleaning element 30 a thickening 32 may be formed which can be arranged in a recess 16. Such a thickening 32 may be formed by pressing a plunger to melted ends of the cleaning element 30. During the injection of the plastic material in order to form a brush head the thickening 32 shall be embedded into the molten plastic. In order to increase the depth of embedding the thickening 32 may be moved away from the surface 12 of partial body 14.1 by moving the stopper plate 14.5 in the direction of the partial bodies 14.1 and 14.2. Thereby, the cleaning element 30 is lifted and a free space appears between the surface 12 and the thickening 32. Plastic material which may be injected into the recess 16 can flow around the thickening 32 to safely embed the cleaning element 30 in the brush head to be formed. The recess 16 represents one part of the brush head to be formed, in particular the part providing the cleaning elements 30.

Figure 1D:
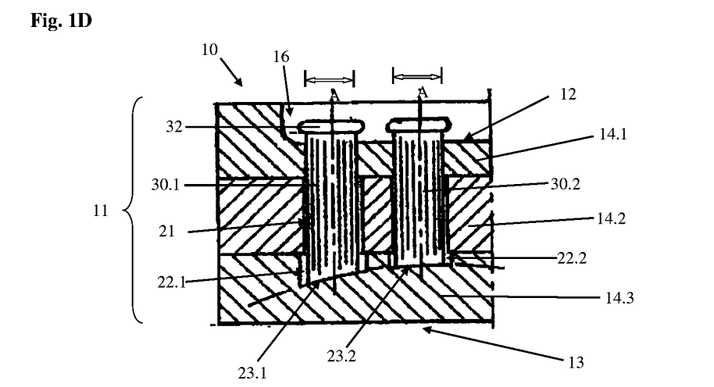
FIG. 1D is a schematic side view of a part of a carrier comprising three partial bodies providing two cleaning elements in a blind hole, wherein the base of the blind hole shows a curved surface according to one or more embodiments illustrated and described herein.

FIG. 1D shows another example embodiment of a carrier 10 for providing at least one cleaning element 30 to a mold cavity. A sectional view of a part of the carrier 10 is shown. All features disclosed in FIGS. 1A to C, whether described individually or in combination are also applicable to the embodiment shown in FIG. 1D. Features that are in common with the carrier 10 shown in FIGS. 1A to C are designated with the same reference numerals. The main body 11 of the carrier 10 shown in FIG. 1D comprises three partial bodies 14.1, 14.2, 14.3. The cross-sectional area A of the through hole 21 of the partial body 14.1 comprising the first surface 12 corresponds to the outline of the cleaning element 30. The cross-sectional area A of the through hole 21 of partial body 14.2 is increased compared to the cross-sectional area A of the through hole 21 of partial body 14.1 and the cross-sectional area A of the blind end 22 of partial body 14.3 is increased compared to the cross-sectional area A of the through hole 21 of partial body 14.2. Two cleaning elements 30.1, 30.2 are shown, wherein the bases 23.1, 23.2 of the blind ends 22.1, 22.2 of the blind holes 20.1, 20.2 are different from each other. The base 23.1 of the blind hole 20.1 shown on the left is inclined compared to the second surface 13. Thus, the cleaning element 30.1 shows an inclined contour of the ends which will protrude from the brush head after injection molding. The base 23.2 of the blind hole 20.2 shown on the right comprises a convex curved contour compared to the second surface 13. Thus, the cleaning element 30.2 shows a concave contour of the ends which will protrude from the brush head after injection molding.

Figure 1E:
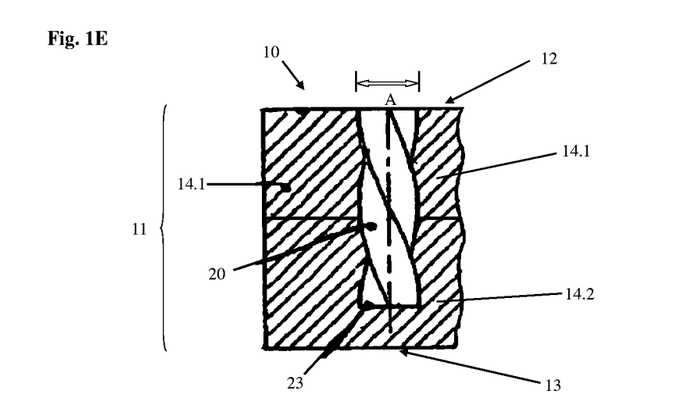
FIG. 1E is a schematic side view of a part of a carrier comprising two partial bodies providing a cleaning element in a blind hole, wherein the blind-hole is twisted along its depth according to one or more embodiments illustrated and described herein.

FIG. 1E shows another example embodiment of a carrier 10 which can provide a cleaning element 30 to a mold cavity. A sectional view of a part of the carrier 10 is shown. All features disclosed in FIGS. 1A to D, whether described individually or in combination are also applicable to the embodiment shown in FIG. 1E. Features that are in common with the carrier 10 shown in FIGS. 1A to D are designated with the same reference numerals. The main body 11 of the carrier 10 shown in FIG. 1E comprises two partial bodies 14.1, 14.2. The blind hole 20 comprises a cylindrical inner surface contour which was twisted. The twist shown comprises three-fourths of a complete turn. However, twists having one or more than one complete turn are also possible. The base 23 of the twisted blind hole 20 is shown as a flat base, other base contours, such as inclined or curved base contours are possible.

Figure 2A:
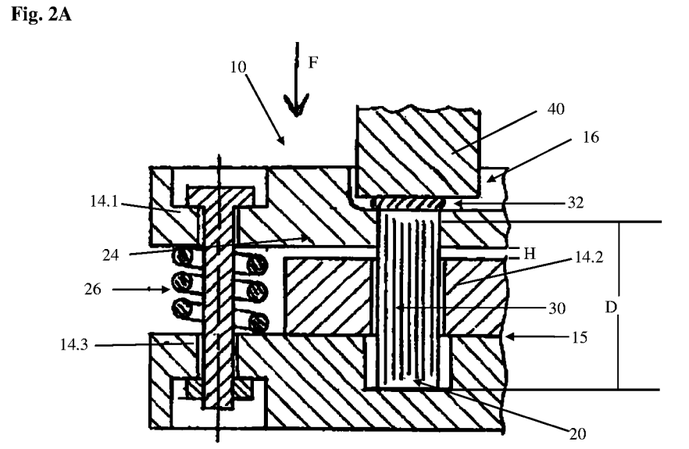
FIG. 2A shows a schematic side view of a part of a carrier comprising three partial bodies providing a cleaning element in a blind hole, wherein a gap is provided between the partial bodies by a spacer according to one or more embodiments illustrated and described herein.

FIG. 2A shows another example embodiment of a carrier 10 for providing at least one cleaning element 30 to a mold cavity. A sectional view of a part of the carrier 10 is shown. All features disclosed in FIG. 1, whether described individually or in combination are also applicable to the embodiment shown in FIG. 2A. Features that are in common with the carrier 10 shown in FIG. 1 are designated with the same reference numerals. The carrier 10 may comprise three partial bodies 14.1, 14.2, 14.3 which are arranged adjacent to each other in the direction of the blind hole 20. The partial bodies 14.2, 14.3 may be arranged in direct contact so that the parallel surfaces of the partial bodies 14.2, 14.3 facing each other represent contact surfaces 15. Between the partial body 14.1 and the partial body 14.2 a gap 24 may be arranged having a height H. The gap 24 may be produced by a spacer 26. The spacer 26 may be a spring which is able to regulate the distance between the partial bodies 14.1 and 14.3. By doing so a gap 24 arises being the difference from the height of the partial body 14.2 and the distance which is spun by the spacer 26. The height H of the gap may be in the range of about 0.1 to about 3.0 mm, and in another embodiment in the range of about 0.2 mm to 0.8 mm. By applying a force F to the partial body 14.1 in the direction of the partial bodies 14.2 or 14.3 the height H of the gap 24 may be decreased.

FIG. 2A further shows the formation of the thickening 32 at the end of the cleaning element 30. The end of the cleaning element 30 can be heated in order to melt the ends. Then a plunger 40 may be applied to the melted ends in order to flatten the thickening 32. Thereby the thickening 32 may come into direct contact with the first surface 12 of the carrier 10. The force which is applied to the thickening 32 is smaller than the force F needed to compress the spacer 26. If the force F is applied and the height H of the gap 24 is decreased or reduced to zero the thickenings 32 are not located in contact to the surface 12 anymore. Than the plastic intended to be injected may flow around and under the thickening 32 so that the cleaning element 32 is securely embedded in the plastic. The distance between the first surface 12 and the second surface 13 can be calculated by adding the depth D of the blind hole 20 and the height H of the gap 24.

Figure 2B:
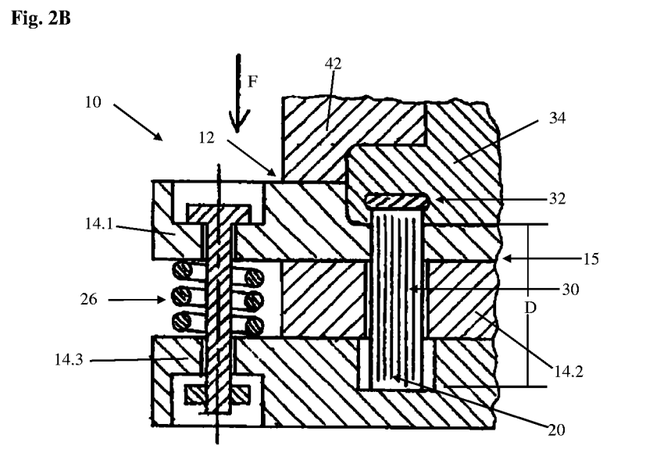
FIG. 2B is a schematic side view of a part of the carrier shown in FIG. 2A after shutting a mold cavity and injecting a plastic in order to form at least a part of a brush head.

FIG. 2B shows a sectional view of the carrier 10 shown in FIG. 2A after a molding device has been shut and the mold cavity has been formed representing the space to be filled with the injected material 34. By shutting the molding device into which the carrier 10 is arranged in order to provide the cleaning element(s) 30 to a mold cavity a first mold half 42 is brought into direct contact with the first surface 12 of the carrier 10. Thereby, the gap 24 may be decreased to zero and the surfaces of the partial bodies 14.1 and 14.2 facing each other come into direct contact to represent contact surfaces 15. The spacer 26 being for example, a spring is thereby compressed and decreased in height due to the force F applied to the partial body 14.1 by the mold half 42. The carrier 10 represents the second mold half inside the molding tool. By decreasing the gap 24 a free space if formed between the thickening 32 and the first surface 12 of the carrier 10. Plastic material 34 can now be injected into the mold cavity formed by the recess 16 provided by the carrier 10 and the mold half 42. The injected material 34 fills the mold cavity thereby embedding the thickening 32 of the cleaning element 30. After cooling of the injected material 34 a brush head 34, in particular a toothbrush head 34 or a part thereof such as a bristle carrier 34 is formed.

Figure 3A:
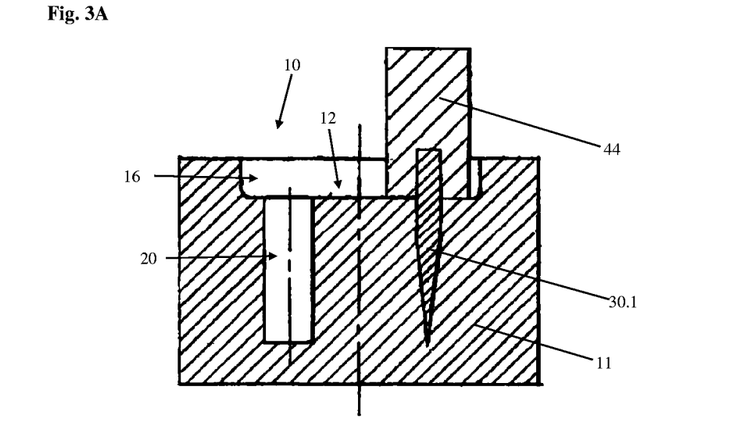
FIG. 3A is a schematic side view of a part of a carrier comprising two blind holes, wherein in one blind hole a cleaning element can be formed using injection molding techniques according to one or more embodiments illustrated and described herein.

FIG. 3A shows another example embodiment of a carrier 10 for providing at least one cleaning element 30.1 to a mold cavity. A sectional view of a part of the carrier 10 is shown. All features disclosed in FIGS. 1 and 2, whether described individually or in combination are also applicable to the embodiment shown in FIG. 3A. Features that are in common with the carrier 10 shown in FIGS. 1 and 2 are designated with the same reference numerals. The carrier 10 comprises a main body 11 which may be sub-divided into several partial bodies (not shown). The carrier 10 comprises one or more blind-hole(s) 20 suitable for providing cleaning elements 30 to a mold cavity. A cleaning element 30.1 is arranged in one of the blind holes 20. The cleaning element 30.1 may be for example, an elastomeric element, such as for example, a nub, a pin, a fin, a wall, a bar, a gutter, a curve, a circle, a textured element, a polishing element or a tongue cleaning element. The elastomeric element 30.1 may be produced in the blind hole 20 by injection molding. Therefore, a mold half 44 defining the outline of the upper part of the elastomeric element 30.1 is arranged at the first face 12 of the carrier 10. In this embodiment, the carrier 10 comprises a recess 16 so that the mold half 44 is located in the recess 16 during formation of the cleaning element 30.1.

Figure 3B:
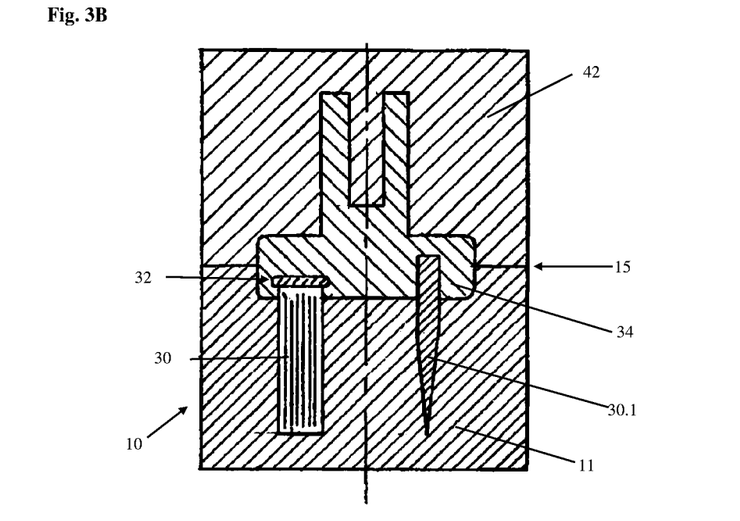
FIG. 3B is a schematic side view of a part of the carrier shown in FIG. 3A after the molding device has been shut and plastic material has been injected into the mold cavity.

FIG. 3B shows a sectional view of the carrier 10 shown in FIG. 3A after a molding device has been shut and the mold cavity has been formed representing the space to be filled with the injected material 34. By shutting the molding device into which the carrier 10 is arranged in order to provide the cleaning element(s) 30, 30.1 to a mold cavity, a mold half 42 is brought into direct contact with the first surface 12 so that the first surface 12 and the surface of the mold half 42 facing the carrier 10 come into direct contact to represent contact surfaces 15. The carrier 10 represents the other mold half inside the molding tool. Plastic material can now be injected into the mold cavity formed by the carrier 10 and the mold half 42. The injected material fills the mold cavity thereby embedding the thickening 32 of the cleaning element 30 and the end of the cleaning element 30.1. The cleaning element 30.1 may be an elastomeric element. Such elastomeric elements may be produced by an elastomeric material which may be partially melted at its surface during over-molding so that the cleaning element 30.1 and injected material 34 are combined chemically. During cooling the injected material 34 solidifies to form a brush head 34, in particular a toothbrush head 34 or a part thereof such as a bristle carrier 34, which provides cleaning elements 30 and 30.1.

Figure 4:
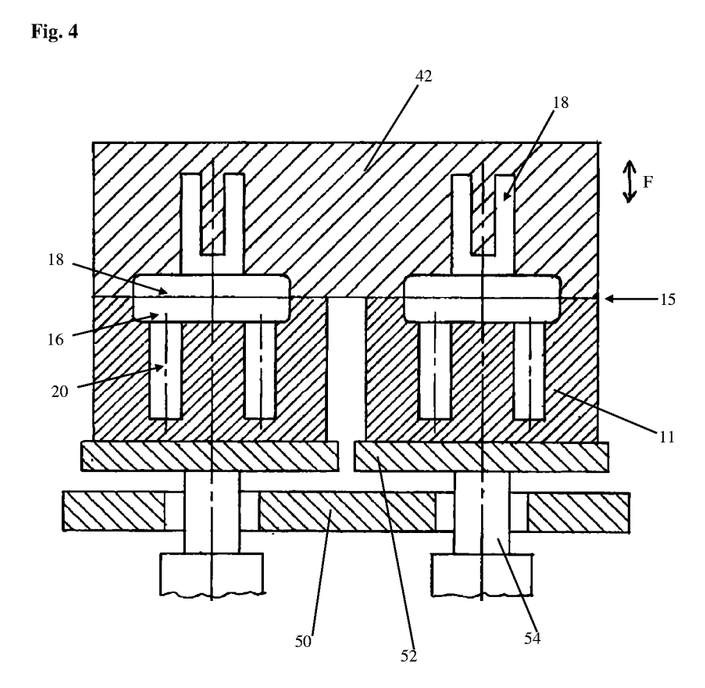
FIG. 4 is a schematic side view of a part of two carriers forming a mold cavity and shows the pressure means for shutting the mold cavity according to one or more embodiments illustrated and described herein.

FIG. 4 shows as an example how to arrange a carrier 10 for providing at least one cleaning element 30 to a mold cavity in a molding tool. A sectional view of a part of two carriers 10 is shown. All features disclosed in FIGS. 1 to 3, whether described individually or in combination are also applicable to the embodiment shown in FIG. 4. Features that are in common with the carrier 10 shown in FIGS. 1 to 3 are designated with the same reference numerals. The carriers 10 comprise main bodies 11 which may be sub-divided into several partial bodies (not shown). The carriers 10 may further comprise one or more blind-hole(s) 20 suitable for providing cleaning elements to a mold cavity. The mold cavity may be formed by the recess 16 provided by the carriers 10 and the mold half 42 providing a recess 18 which corresponds to the recess 16 and represent the outline of a brush head, in particular a toothbrush head or a part thereof such as a bristle carrier 34.

Two or more carriers 10 may be arranged at a base plate 50. The carriers may be located directly on the base plate 50 or the carriers may be arranged on a carrier plate 52 which is arranged on the base plate 50. The carriers 10 may be arranged on the carrier plate(s) 52 and/or the base plate 50 using clamping or fixation means, such as screws or clamps. In one embodiment, the carriers 10 may be arranged permanently on the carrier plate(s) 52 and movable on the base plate 50. The base plate 50 may comprise through holes in which a pressure unit 54 may be arranged. The pressure unit 54 may be a hydraulic plunger, a spring, a pneumatic plunger or an actuator. The pressure unit 54 may be used to press the carrier 10 against the mold half 42 in order to shut the mold cavity formed by the recesses 16 and 18. After the plastic material 34 which forms the brush head, in particular the toothbrush head or the part thereof such as a bristle carrier, has been injected and has at least partially solidified the pressure unit 54 may be removed from the carrier plate 52. Simultaneously or afterwards, the mold half 42 may be removed from the carrier 10 and the carrier 10 together with the molded brush head 34 may be removed from the whole molding tool for final cooling. After final cooling the brush head 34 may be removed from the carrier 10 by removing the cleaning elements 30, 30.1 from the blind holes 20.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of producing at least a part of a brush head comprising providing one end of at least one cleaning element to a mold cavity for over-molding using a carrier and over-molding the provided end with a plastic material, wherein the carrier comprises a main body having a first surface including one or more openings of one or more blind holes having a depth for carrying the at least one cleaning element and a second surface being substantially parallel to the first surface, wherein the main body includes at least two partial bodies arranged adjacent to each other in the direction of the one or more blind holes so that at least one partial body comprises one or more through holes as part of the one or more blind holes and one partial body comprising the second surface of the main body comprises the blind end of the one or more blind holes, wherein the depth of the one or more blind holes is identical to a free length of the at least one cleaning element and wherein a cross-sectional area of the one or more blind holes increases in the direction of the blind end of the one or more blind holes, and wherein the cleaning elements have ends heated to form a thickening that is flattened by pressing a flattening tool against the thickening until the thickening is in direct contact with the first surface of the carrier, and moving the first surface of the carrier in the direction of the second surface so that a gap is formed between the thickening and the first surface of the carrier.

2. The method according to claim 1, wherein the at least two partial bodies are arranged in direct contact to each other.

3. The method according to claim 1, wherein a gap is located between the at least two partial bodies.

4. The method according to claim 3, wherein a height (H) of the gap is defined by a spacer.

5. The method according to claim 1, wherein the one or more blind holes are arranged perpendicular or inclined to the first and second surface of the main body.

6. The method according to claim 1, wherein the at least two partial bodies are movable in at least one direction along contact surfaces.

7. The method according to claim 1, wherein at least one of the blind holes is a mold cavity for molding the at least one cleaning element.

8. The method according to claim 1, wherein the first surface of the carrier includes a recess representing a part of the mold cavity for molding a cleaning element carrier, a brush head or a part thereof.

9. The method according to claim 1, wherein at least a partial body comprising the first surface consists of steel, ceramic, plastic material or synthetic resin.

10. The method according to claim 1, wherein a plurality of blind holes is arranged in a pattern that corresponds to the bristle pattern in the brush head to be formed in the mold cavity to which the at least one cleaning element is provided.

11. The method according to claim 1, wherein the partial body comprising the second surface is a stopper plate.

12. The method according to claim 1, wherein the cleaning element is formed in at least one of the blind holes of the carrier by injection molding.

* * * * *